United States Patent [19]
Ahmed et al.

[11] Patent Number: 6,127,487
[45] Date of Patent: Oct. 3, 2000

[54] PROCESS TO PRODUCE COUPLED BLOCK COPOLYMERS AND SAID COPOLYMERS

[75] Inventors: Iqbal Ahmed; George A. Moczygemba; Jianxin Kuang; Larry L. Nash, all of Bartlesville, Okla.

[73] Assignee: Phillips Petroleum Company, Bartlesville, Okla.

[21] Appl. No.: 09/172,639

[22] Filed: Oct. 14, 1998

[51] Int. Cl.$^7$ ...................................................... C08L 53/02
[52] U.S. Cl. ........................... 525/272; 525/271; 525/314
[58] Field of Search ...................................... 525/271, 272, 525/314

[56] References Cited

U.S. PATENT DOCUMENTS

| | | | |
|---|---|---|---|
| 4,091,053 | 5/1978 | Kitchen | 260/880 |
| 4,584,346 | 4/1986 | Kitchen | 525/98 |
| 5,319,033 | 6/1994 | Trepka et al. | 525/314 |
| 5,393,838 | 2/1995 | Moczygemba et al. | 525/314 |
| 5,399,628 | 3/1995 | Moczygemba et al. | 525/314 |
| 5,587,425 | 12/1996 | Moczygemba et al. | 525/314 |
| 5,705,569 | 1/1998 | Moczygemba et al. | 525/314 |
| 5,910,546 | 6/1999 | Trepka et al. | 525/314 |

*Primary Examiner*—P. Hampton Hightower
*Attorney, Agent, or Firm*—Richmond, Hitchcock, Fish & Dollar

[57] ABSTRACT

This invention provides a process to produce coupled block copolymers and said coupled block copolymers.

12 Claims, No Drawings

PROCESS TO PRODUCE COUPLED BLOCK COPOLYMERS AND SAID COPOLYMERS

FIELD OF THE INVENTION

This invention is related to the field of processes that produce coupled block copolymers and to the field of said copolymers.

BACKGROUND OF THE INVENTION

The production of compositions that comprise block copolymers is a multi-million dollar business. Millions of dollars have been spent to improve the physical properties of such compositions. In particular, there has been a long felt desire to improve the injection molding properties of such compositions, particularly compositions that comprise coupled block copolymers, such as the coupled block copolymers of the present invention, thereby improving the processing of articles molded from these coupled block copolymer compositions.

SUMMARY OF THE INVENTION

It is an object of this invention to provide a process to produce coupled block copolymers.

It is another object of this invention to provide said coupled block copolymers.

In accordance with this invention a process to produce coupled block copolymers is provided. Said process comprises (or optionally, consists essentially of, or consists of):

(1) charging diluent, polar compound, initiator ($I_1$), and monovinylarene ($S_1$), to a polymerization zone, to form a first mixture;

(2) polymerizing, under solution polymerization conditions, said monovinylarene ($S_1$), until essentially no unpolymerized monovinylarene is left in said first mixture, to form a second mixture that comprises $S_1$–$I_1$;

(3) charging conjugated diene ($B_1$), to said second mixture to form a third mixture;

(4) polymerizing, under solution polymerization conditions, said conjugated diene ($B_1$), until essentially no unpolymerized conjugate diene is left in said third mixture, to form a fourth mixture that comprises $S_1$–$B_1$–$I_1$;

(5) charging monovinylarene ($S_2$), to said fourth mixture to form a fifth mixture;

(6) polymerizing, under solution polymerization conditions, said monovinylarene ($S_2$), until essentially no unpolymerized monovinylarene is left in said fifth mixture, to form a sixth mixture that comprises $S_1$–$B_1$–$S_2$–$I_1$;

(7) charging initiator ($I_2$) and monovinylarene ($S_3$) to said sixth mixture to form a seventh mixture;

(8) polymerizing, under solution polymerization conditions, said monovinylarene ($S_3$), until essentially no unpolymerized monovinylarene is left in said seventh mixture, to form an eighth mixture that comprises $S_1$–$B_1$–$S_2$–$S_3 I_1$ and $S_3$–$I_2$;

(9) charging conjugated diene ($B_2$), to said eighth mixture to form a ninth mixture;

(10) polymerizing, under solution polymerization conditions, said conjugated diene ($B_2$), until essentially no unpolymerized conjugate diene is left in said ninth mixture, to form a tenth mixture that comprises $S_1$–$B_1$–$S_2$–$S_3$–$B_2$–$I_1$ and $S_3$–$B_2$–$I_2$, which are block copolymers;

(11) charging coupling agent (C) to said tenth mixture to form an eleventh mixture;

(12) coupling said block copolymers to form a twelfth mixture.

In accordance with this invention coupled block copolymers are provided. Said coupled block copolymers comprise coupling agent and two or more block copolymers, where said block copolymers comprise $S_1$–$B_1$–$S_2$–$S_3$–$B_2$ and $S_3$–$B_2$.

These objects and other objects will become more apparent by reference to the following.

The terms "comprise", "comprises" and "comprising" are open-ended and do not exclude the presence of other steps, elements, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as long as such steps, elements, or materials, do not affect the basic and novel characteristics of the invention, additionally, they do not exclude impurities normally associated with the elements and materials used.

DETAILED DESCRIPTION OF THE INVENTION

This invention claims a process to produce coupled block copolymers. This process comprises the following steps.

Step (1) is charging diluent, polar compound, initiator ($I_1$), and monovinylarene ($S_1$), to a polymerization zone, to form a first mixture.

The diluent is a hydrocarbon, preferably, a cycloparaffin. Examples of such diluents are butane, pentane, hexane, isooctane, cyclopentane, and cyclohexane. Mixtures of hydrocarbons can be used. Currently, it is preferred to use a diluent that comprises, in major part, cyclohexane.

The polar compound is a compound that is used for vinyl control of the diene polymer blocks and/or to improve the effectiveness of the initiator. Examples of such polar compounds are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine. Mixtures of these polar compounds can be used in this invention. Presently preferred are either tetrahydrofuran or diethyl ether.

The initiator is an organo-mono-alkali-metal compound having the formula RM where R is a hydrocarbyl and M is an alkali metal. Examples of such compounds are n-butyllithium and sec-butyllithium. Currently, n-butyllithium is preferred. The amount of initiator ($I_1$) to use in this step is from about 0.02 to about 0.2 parts per 100 parts by weight, based on the total weight of monomers to be charged to the polymerization zone (i.e. the total weight of $S_1+S_2+S_3+B_1+B_2$ if these are the only monomer charges to the reactor). However, it is preferred to use from about 0.03 to about 0.10 parts, more preferably, 0.05 to 0.07 parts by weight.

The monovinylarenes used in this invention contain from about 8 to about 12 carbon atoms per molecule. Examples of such monovinylarenes are styrene, alpha-methylstyrene, p-vinyltoluene, m-vinyltoluene, o-vinyltoluene, 4-ethylstyrene, 3-ethylstyrene, 2-ethylstyrene, 4-tert-butylstyrene, and 2,4-dimethylstyrene. Currently, styrene is preferred. Mixtures of monovinylarenes can be used. The amount of monovinylarene to use in this step is from about 20 to about 55 weight percent, based on the weight of the total weight of monomers to be charged to the polymerization zone (i.e. the total weight of $S_1+S_2+S_3+B_1+B_2$ if these are the only monomer charges to the reactor). However, it is preferred to use from about 25 to about 50 weight percent, more preferably, 30 to 45 weight percent.

It should be noted that ($S_X$) stands for the unpolymerized monomers and for the polymonovinylarene block formed by the substantially complete polymerization of the monovinylarene monomers. "X" stands for the charge number.

The polymerization zone can be any zone suitable for containing the copolymerization. A suitable example is a reactor.

Contacting these compounds together forms the first mixture.

Step (2) is polymerizing, under solution polymerization conditions, said monovinylarene ($S_1$), until essentially no unpolymerized monovinylarene is left in said first mixture, to form a second mixture that comprises $S_1-I_1$.

The polymerization is conducted under solution polymerization conditions. Examples of such conditions are disclosed in U.S. Pat. Nos. 4,091,053; 4,584,346; and 5,319,033; the entire disclosures of which are hereby incorporated by reference. In general, the temperature should be in the range of about −100° C. to about 150° C. However, it is preferred if the temperature is in the range of about 0° C. to about 110° C. In general, the pressure is maintained in a range that is sufficient to maintain the contents of the reactor substantially in the liquid phase. However, it is preferred if the pressure is from about 15 psia to about 100 psia.

The phrase "essentially no unpolymerized monovinylarene is left" means that if any amount of unpolymerized monovinylarene is left in the polymerization zone at the start of the Step (3), then this amount will not substantially affect the impact properties of the coupled block copolymer resulting therefrom, when compared to a coupled block copolymer produced the same way but when no amount of unpolymerized monovinylarene is left in the polymerization zone at the start of the Step (3). It is preferred that the amount of unpolymerized monovinylarene left at the start of Step (3) is less than 5 weight percent, based on the weight of the total weight of monomers to be charged to the polymerization zone (i.e. the total weight of $S_1+S_2+S_3+B_1+B_2$ if these are the only monomer charges to the reactor). It is more preferred that the amount is less than 1 weight percent, and that is most preferred if the amount is less than 0.01 weight percent.

This solution polymerization forms the second mixture that comprises $S_1-I_1$.

Step (3) is charging conjugated diene ($B_1$), to said second mixture to form a third mixture.

The conjugated dienes employed in this invention are those having 4 to about 8 carbon atoms per molecule. Examples of such dienes are 1,3 butadiene, isoprene, 2-ethyl-1,3 butadiene, 2,3-dimethyl-1,3-butadiene, piperylene. Currently, 1,3 butadiene is preferred. Mixtures of such dienes can be used. The amount of conjugated diene to use in this step is from about 0.5 to about 20 weight percent, based on the weight of the total weight of monomers to be charged to the polymerization zone (i.e. the total weight of $S_1+S_2+S_3+B_1+B_2$ if these are the only monomer charges to the reactor). However, it is preferred to use from about 1 to about 10 weight percent, more preferably, 1 to 5 weight percent.

It should be noted that ($B_X$) stands for the unpolymerized monomers and for the polyconjugated diene block formed by the substantially complete polymerization of the conjugated diene monomers. "X" stands for the charge number.

Contacting the second mixture with said conjugated diene forms the third mixture.

Step (4) is polymerizing, under solution polymerization conditions, said conjugated diene ($B_1$), until essentially no unpolymerized conjugated diene is left in said third mixture, to form a fourth mixture that comprises $S_1-B_1-I_1$.

The phrase "essentially no unpolymerized conjugated diene is left" means that if any amount of unpolymerized conjugated diene is left in the polymerization zone at the start of the Step (5), then this amount will not substantially affect the impact properties of the coupled block copolymer resulting therefrom, when compared to a coupled block copolymer produced the same way but when no amount of unpolymerized conjugated diene is left in the polymerization zone at the start of the Step (5). It is preferred that the amount of unpolymerized conjugated left at the start of Step (5) is less than 5 weight percent, based on the weight of the total weight of monomers to be charged to the polymerization zone (i.e. the total weight of $S_1+S_2+S_3+B_1+B_2$ if these are the only monomer charges to the reactor). It is more preferred that the amount is less than 1 weight percent, and it is most preferred that the amount is less than 0.01 weight percent.

This solution polymerization forms the fourth mixture that comprises $S_1-B_1-I_1$.

Step (5) is charging monovinylarene ($S_2$), to said fourth mixture to form a fifth mixture.

The amount of monovinylarene to use in this step is from about 10 to about 25 weight percent, based on the weight of the total weight of monomers to be charged to the polymerization zone (i.e. the total weight of $S_1+S_2+S_3+B_1+B_2$ if these are the only monomer charges to the reactor). However, it is preferred to use from about 11 to about 22 weight percent, more preferably, 13 to 19 weight percent.

Contacting the fourth mixture with said monovinylarene forms the fifth mixture.

Step (6) is polymerizing, under solution polymerization conditions, said monovinylarene ($S_2$), until essentially no unpolymerized monovinlarene is left in said fifth mixture, to form a sixth mixture that comprises $S_1-B_1-S_2-I_1$.

Step (7) is charging initiator ($I_2$) and monovinylarene ($S_3$) to said sixth mixture to form a seventh mixture.

The amount of initiator ($I_2$) to use in this step is from about 0.06 to about 0.2 parts per 100 parts by weight, based on the total weight of monomers to be charged to the polymerization zone (i.e. the total weight of $S_1+S_2+S_3+B_1+B_2$ if these are the only monomer charges to the reactor). However, it is preferred to use from about 0.06 to about 0.15 parts, more preferably, 0.08 to 0.13 parts by weight.

The amount of monovinylarene to use in this step is from about 10 to about 30 weight percent, based on the weight of the total weight of monomers to be charged to the polymerization zone (i.e. the total weight of $S_1+S_2+S_3+B_1+B_2$ if these are the only monomer charges to the reactor). However, it is preferred to use from about 12 to about 28 weight percent, more preferably, 17 to 27 weight percent.

Contacting the sixth mixture with these compounds forms the seventh mixture.

Step (8) is polymerizing, under solution polymerization conditions, said monovinylarene ($S_3$), until essentially no unpolymerized monovinylarene is left in said seventh mixture, to form an eighth mixture that comprises $S_1-B_1-S_2-S_3-I_1$ and $S_3-I_2$.

Step (9) is charging conjugated diene ($B_2$), to said eighth mixture to form a ninth mixture.

The amount of conjugated diene to use in this step is from about 5 to about 35 weight percent, based on the weight of the total weight of monomers to be charged to the polymerization zone (i.e. the total weight of $S_1+S_2+S_3+B_1+B_2$ if these are the only monomer charges to the reactor). However, it is preferred to use from about 7 to about 33 weight percent, more preferably, 10 to 30 weight percent.

Contacting the eighth mixture with said conjugated diene forms the ninth mixture.

Step (10) polymerizing, under solution polymerization conditions, said conjugated diene ($B_2$), until essentially no unpolymerized conjugate diene is left in said ninth mixture, to form a tenth mixture that comprises $S_1-B_1-S_2-S_3-B_2-I_1$ and $S_3-B_2-I_2$, which are block copolymers.

Step (11) is charging coupling agent (C) to said tenth mixture to form an eleventh mixture.

The coupling agent is any compound that joins two or more block copolymers. Examples of such compounds are di, or multi, vinylaromatic compounds; di, or multi, epoxides; di, or multi, isocyanates; di, or multi, imines; di, or multi, aldehydes; di, or multi, ketones; di, or multi, halides; mono, di, or multi, anhydrides; mono, di, or multi, esters. Currently, epoxidized soybean oils are preferred. The amount of coupling agent (C) to use in this step is about from about 0.2 to about 1 part per 100 parts by weight, based on the total weight of monomers to be charged to the polymerization zone (i.e. the total weight of $S_1+S_2+S_3+B_1+B_2$ if these are the only monomer charges to the reactor). However, it is preferred to use from about 0.25 to about 0.75 parts, more preferably, 0.3 to 0.5 parts by weight.

Contacting the tenth mixture with said coupling agent forms the eleventh mixture.

Step (12) is coupling said block copolymers to form a twelfth mixture.

Following completion of the coupling reaction, the coupled block copolymer, which may still contain bound alkali metal atoms depending on the type of coupling agent employed, is treated by various means, as is known in the art, such as, for example, by carbon dioxide and water, or treated with acids, such as disclosed in U.S. Pat. No. 4,403,074, to remove any remaining alkali metal from said copolymer followed by recovering said copolymer.

The twelfth mixture usually contains about 10 to 50, more usually 20 to 40, weight percent solids with the balance being solvent. Preferably, but not necessarily, the polymer is flashed to remove by evaporation a portion of the solvent so as to reduce the solvent content to a concentration of about 5 to 50, more usually about 5 to 40, weight percent (corresponding to a solids content of about 95 to 50, more usually about 95 to 60, weight percent).

Final devolatization steps reduced the solvent content in the final product to less than 4000 ppm.

The products can be, and normally are, compounded with antioxidants, antiblocking agents, release agents, and the like, as known in the compounding arts.

The coupled block copolymers have a total monovinylarene content of about 60 to about 90 weight percent, based on the total weight of the monomers polymerized. It is more preferable that the amount is about 65 to about 85 weight percent, and more preferably 70 to 80 weight percent. The remainder being, in major part, conjugated diene.

The melt index desired for these coupled block copolymers is from about 10 to about 50 grams per ten minutes, preferably about 15 to about 45, and most preferably from 15 to 40. The melt index was determined in accordance with ASTM D 1238 (200° C., 5 kg load). The izod impact tests were conducted in accordance with ASTM D 256.

EXAMPLES

Example One

Table One discloses the compounds added to the reactor, the amount of these compounds added to the reactor, the time such compounds were added to the reactor, the reactor temperature, and the reactor pressure. The coupled block copolymer produced had a melt index of 19.51 grams per ten minutes. It also had a number average molecular weight (as measured by gel permeation chromatography) of 116,887. The notched Izod impact was 0.26 ft·lbs/inch. The un-notched Izod was 3.38 ft·lbs/inch.

Example Two

Table Two discloses the compounds added to the reactor, the amount of these compounds added to the reactor, the time such compounds were added to the reactor, the reactor temperature, and the reactor pressure. The coupled block copolymer produced had a melt index of 19.8 grams per ten minutes. It also had a number average molecular weight (as measured by gel permeation chromatography) of 113,889. The notched Izod impact was 0.3 ft·lbs/inch. The un-notched Izod was 3.6 ft·lbs/inch.

Example Three

About 1000 lbs of the inventive polymer was prepared in a pilot plant by charging the following materials: 0.058 phm (parts per 100 parts monomer) m-butyllithium; 37 phm styrene; 2 phm butadiene; 16 phm styrene; 0.125 phm n-butyllithium; 24 phm styrene; 21 phm butadiene; 0.423 phm Vikoflex 7170; into the polymerization zone. The coupled block copolymer produced had a melt index of 14.6 grams per ten minutes. The notched Izod impact was 0.17 ft·lbs/inch. The un-notched Izod was 2.7 ft·lbs/inch.

Example Four (Comparative)

Table Four discloses the compounds added to the reactor, the amount of these compounds added to the reactor, the time such compounds were added to the reactor, the reactor temperature, and the reactor pressure. The coupled block copolymer produced had a melt index of 9.3 grams per ten minutes. The notched Izod impact was 0.23 ft·lbs/inch. The un-notched Izod was 3.72 ft·lbs/inch.

Example Five (Comparative-Commercial Resin KR01)

This coupled block copolymer had a melt index of 8.7 grams per ten minutes. The notched Izod impact was 0.34 ft·lbs/inch. The un-notched Izod was 4.3 ft·lbs/inch.

Example Six (Comparative-Commercial Resin BASF 656C)

This styrene-butadiene block copolymer had a melt index of 13.9 grams per ten minutes. The notched Izod impact was 0.30 ft·lbs/inch. The un-notched Izod was 4.2 ft·lbs/inch.

TABLE ONE

| Compound Used | Amount Used | Time (minutes) | Temperature (° C.) | Pressure (psia) |
|---|---|---|---|---|
| cyclohexane | 6.9 lbs | 0.0 | 112.8 | 15.0 |
| THF | 4.0 cubic centimeters | 4.2 | 45.9 | 58.5 |
| n-butyllithium | 61.7 grams | 4.2 | 45.9 | 58.5 |
| styrene | 741.5 grams | 5.4 | 47.5 | 60.7 |
| butadiene | 19.9 grams | 18.0 | 77.4 | 74.9 |
| styrene | 321.3 grams | 32.3 | 67.8 | 65.9 |
| n-butyllithium | 120.3 grams | 68.2 | 54.6 | 50.5 |
| styrene | 460.8 grams | 69.8 | 50.5 | 53.9 |
| butadiene | 459.1 grams | 81.3 | 62.5 | 58.1 |
| Vikoflex 7170 | 18.2 cubic centimeters | 97.2 | 97.7 | 102.0 |

1. THF was added as a solution, where said solution contained 20 weight percent THF and 80 weight percent cyclohexane.
2. n-butyllithium was added as a solution, where said solution contained 2 weight percent n-butyllithium and 98 weight percent cyclohexane.
3. Vikoflex 7170 was added as a solution, where said solution contained cyclohexane and Vikoflex 7170, and where said solution contained 0.5 grams Vikoflex per 1 cubic centimeter of solution.

TABLE TWO

| Compound Used | Amount Used | Time (minutes) | Temperature (° C.) | Pressure (psia) |
|---|---|---|---|---|
| cyclohexane | 6.9 lbs | 0.0 | 100.5 | 36.3 |
| THF | 4.0 cubic centimeters | 1.7 | 45.5 | 61.8 |
| n-butyllithium | 59.6 grams | 1.7 | 45.5 | 61.9 |
| styrene | 740.8 grams | 3.0 | 48.7 | 63.7 |
| butadiene | 41.6 grams | 14.0 | 57.1 | 71.0 |
| styrene | 320.4 grams | 28.0 | 59.4 | 64.3 |
| n-butyllithium | 111.3 grams | 46.1 | 55.4 | 59.2 |
| styrene | 480.4 grams | 47.8 | 54.0 | 64.3 |
| butadiene | 420.6 grams | 58.8 | 57.2 | 66.5 |
| Vikoflex 7170 | 16.9 cubic centimeters | 84.6 | 97.6 | 97.6 |

1. THF was added as a solution, where said solution contained 20 weight percent THF and 80 weight percent cyclohexane.
2. n-butyllithium was added as a solution, where said solution contained 2 weight percent n-butyllithium and 98 weight percent cyclohexane.
3. Vikoflex 7170 was added as a solution, where said solution contained cyclohexane and Vikoflex 7170, and where said solution contained 0.5 grams Vikoflex per 1 cubic centimeter of solution.

TABLE FOUR

| Compound Used | Amount Used | Time (minutes) | Temperature (° C.) | Pressure (psia) |
|---|---|---|---|---|
| cyclohexane | 6.9 lbs | 0.0 | 103.5 | 7.4 |
| THF | 4.0 cubic centimeters | 7.6 | 46.6 | 22.9 |
| n-butyllithium | 70.2 grams | 7.6 | 46.7 | 23.0 |
| styrene | 742.6 grams | 8.4 | 46.8 | 24.4 |
| styrene | 322.3 grams | 21.8 | 66.8 | 32.1 |
| n-butyllithium | 90.0 grams | 41.0 | 56.5 | 32.1 |
| styrene | 440.9 grams | 42.0 | 55.0 | 35.3 |
| butadiene | 500.1 grams | 60.0 | 57.6 | 34.3 |
| Vikoflex 7170 | 16.5 cubic centimeters | 75.1 | 97.5 | 59.7 |

1. THF was added as a solution, where said solution contained 20 weight percent THF and 80 weight percent cyclohexane.
2. n-butyllithium was added as a solution, where said solution contained 2 weight percent n-butyllithium and 98 weight percent cyclohexane.
3. Vikoflex 7170 was added as a solution, where said solution contained cyclohexane and Vikoflex 7170, and where said solution contained 0.5 grams Vikoflex per 1 cubic centimeter of solution.

That which is claimed is:

1. A process to produce coupled block copolymers said process comprising:

(1) charging diluent, polar compound, initiator ($I_1$), and monovinylarene ($S_1$), to a polymerization zone, to form a first mixture;

(2) polymerizing, under solution polymerization conditions, said monovinylarene ($S_1$), until essentially no unpolymerized monovinylarene is left in said first mixture, to form a second mixture that comprises $S_1$-$I_1$;

(3) charging conjugated diene ($B_1$), to said second mixture to form a third mixture;

(4) polymerizing, under solution polymerization conditions, said conjugated diene ($B_1$), until essentially no unpolymerized conjugated diene is left in said third mixture, to form a fourth mixture that comprises $S_1-B_1-I_1$;

(5) charging monovinylarene ($S_2$), to said fourth mixture to form a fifth mixture;

(6) polymerizing, under solution polymerization conditions, said monovinylarene ($S_2$), until essentially no unpolymerized monovinylarene is left in said fifth mixture, to form a sixth mixture that comprises $S_1-B_1-S_2-I_1$;

(7) charging initiator ($I_2$) and monovinylarene ($S_3$) to said sixth mixture to form a seventh mixture;

(8) polymerizing, under solution polymerization conditions, said monovinylarene ($S_3$), until essentially no unpolymerized monovinylarene is left in said seventh mixture, to form an eighth mixture that comprises $S_1-B_1-S_2-S_3-I_1$ and $S_3-I_2$;

(9) charging conjugated diene ($B_2$), to said eighth mixture to form a ninth mixture;

(10) polymerizing, under solution polymerization conditions, said conjugated diene ($B_2$), until essentially no unpolymerized conjugated diene is left in said ninth mixture, to form a tenth mixture that comprises $S_1-B_1-S_2-S_3-B_2-I_1$, and $S_3-B_2-I_2$, which are block copolymers;

(11) charging coupling agent (C) to said tenth mixture to form an eleventh mixture;

(12) coupling said block copolymers to form a twelfth mixture.

2. A process according to claim 1 wherein said diluent comprises, in major part, cyclohexane.

3. A process according to claim 2 wherein said polar compound is tetrahydrofuran or diethyl ether or both.

4. A process according to claim 3 wherein said initiator is n-butyllithium.

5. A process according to claim 4 wherein said monovinylarene is styrene.

6. A process according to claim 5 where said conjugated diene is 1,3 butadiene.

7. A process according to claim 6 wherein said coupling agent is an epoxidized soybean oil.

8. A coupled block copolymer produced in accordance with claim 1.

9. A coupled block copolymer produced in accordance with claim 7.

10. A coupled block copolymer, where said coupled block copolymers comprise coupling agent and two or more block copolymers, where said block copolymers comprise $S_1-B_1-S_2-S_3-B_2$ and $S_3-B_2$.

11. A process of using said coupled block copolymer in claim 10 to form articles.

12. An article produced in accordance with claim 11.

\* \* \* \* \*